United States Patent Office.

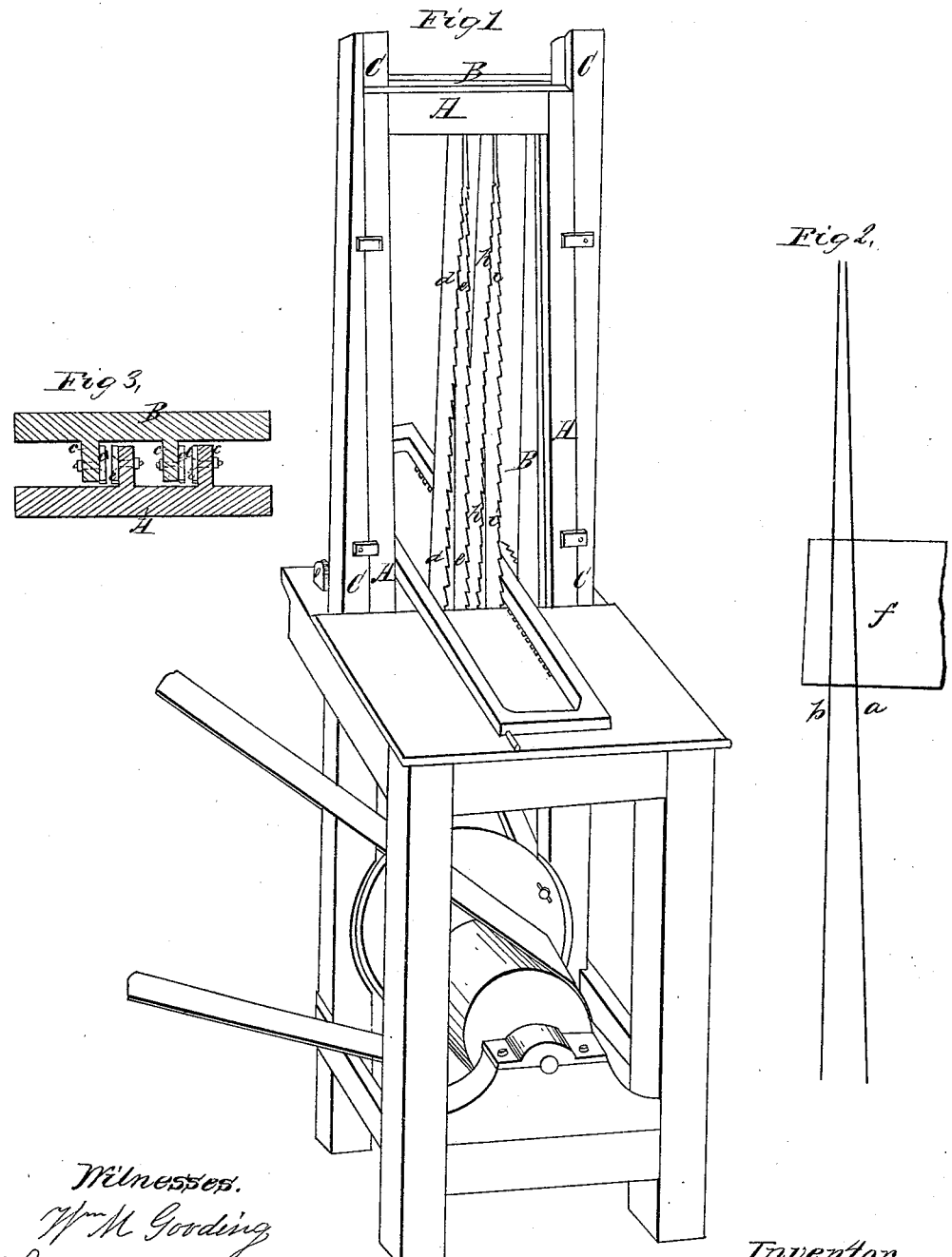

IMPROVEMENT IN SAWING SHINGLES.

FRANCIS B. NORTHROP, OF NEWARK, NEW JERSEY.

*Letters Patent No. 60,542, dated December 18, 1866.*

The Schedule referred to in these Letters Patent and making part of the same.

TO ALL WHOM IT MAY CONCERN:

Be it known that I, FRANCIS B. NORTHROP, of the city of Newark, in the county of Essex, and State of New Jersey, have made certain Improvements in Machines for Sawing at different angles through the same block; and I do hereby declare the following to be a full and exact description of the same, reference being herein had to the drawings that accompany this specification, and which make part of the same.

The nature of my improvement consists in providing for motion, in varied inclinations, of straight saws, in their passing through the same block at the same time.

In the drawings, Figure 1 is a perspective view of a machine adapted to sawing shingles lengthwise from the block, the four saws cutting four shingles at one time; and by having the gang of saws increased, the whole block can be sawed into shingles in one passage by the saws. The peculiar construction consists in the two or more gates to which the saws are attached being made to travel in rebates, or in grooves, as the case may be, that are of differing inclinations or angles. A is one gate that moves up and down on the angle $a$, Figure 2, and B is another gate, moving on the angle $b$, fig. 2; the one on the front of the posts C, and the other on the back of the same posts, the angles being edgewise to the gates. Figure 3 shows the top bars of the two gates A and B, the bottom bars being similar thereto. Each of these bars has as many projections, $c$, as it is desired to have saws to cut on the peculiar angle to which that gate is inclined. To these projections the saws are affixed in any convenient manner, the teeth of the saws on A being toward the bar, and on B the backs of the saws are toward the bar; thus the cutting edges of the saws are brought to the same front line. When the two bars, fig. 3, descend, the saws $e$ and $i$ move on the incline $a$, fig. 2, and those marked $d$ and $h$, on the angle $b$. The distance of the saws from each other, at their ends, varying uniformly as the gates descend or ascend, each saw preserving its own line, blocks of timber or of stone can be cut to any angle or bevel on one side, and straight on the other. An adaptation of the machine to the cutting of curved bevelled ship timber can be made advantageously as to labor and economy of material. Any desirable feed motion can be attached to the carriage, and the gates can be attached to the connecting-rod in any convenient way, admitting the vibratory motion of the gates, and the machine may be driven by belt or gearing, as may be most convenient.

I do not claim sawing on an angle, but what I claim as my improvement, and desire to secure by Letters Patent, is—

1. Sawing a block of wood into shingles, or other analogous things having alternate buts and points, by means of a gang of reciprocating saws, when arranged and operated substantially as described.

2. The projections $c$, on the cross-bars of the two gates, when used in combination with the two reciprocating gates, having a gang of saws operating substantially as described.

FRANCIS B. NORTHROP.

Witnesses:
W. M. GOODING,
SIDNEY U. EDWARDS.